US012740576B2

(12) United States Patent
Liu et al.

(10) Patent No.: US 12,740,576 B2
(45) Date of Patent: Sep. 22, 2026

(54) TEA-BASED BEVERAGE

(71) Applicant: NATIONAL UNIVERSITY OF SINGAPORE, Singapore (SG)

(72) Inventors: Shao Quan Liu, Singapore (SG); Rui Wang, Singapore (SG); Mingzhan Toh, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 531 days.

(21) Appl. No.: 18/015,415

(22) PCT Filed: Jul. 16, 2021

(86) PCT No.: PCT/SG2021/050419
§ 371 (c)(1),
(2) Date: Jan. 10, 2023

(87) PCT Pub. No.: WO2022/015248
PCT Pub. Date: Jan. 20, 2022

(65) Prior Publication Data

US 2023/0232853 A1 Jul. 27, 2023

(30) Foreign Application Priority Data

Jul. 16, 2020 (SG) ........................... 10202006784Q

(51) Int. Cl.
*A23F 3/16* (2006.01)
*A23L 33/135* (2016.01)
*A23L 33/145* (2016.01)

(52) U.S. Cl.
CPC ............ *A23F 3/166* (2013.01); *A23L 33/135* (2016.08); *A23L 33/145* (2016.08)

(58) Field of Classification Search
CPC ....... A23F 3/166; A23L 33/145; A23L 33/135
(Continued)

(56) References Cited

U.S. PATENT DOCUMENTS 7,115,291 B1 10/2006 Kuma et al.
7,927,638 B2 * 4/2011 Kuma .................... A61P 31/04 426/582

FOREIGN PATENT DOCUMENTS

BR 102012008882 12/2013
BR 1021012008882 12/2013
(Continued)

OTHER PUBLICATIONS

International Search Report for PCT/SG2021/050419, mailed Aug. 23, 2021, 3 pages.
(Continued)

*Primary Examiner* — Brent T O'Hern
(74) *Attorney, Agent, or Firm* — Joshua B. Brady; Nixon & Vanderhye, P.C.

(57) ABSTRACT

The invention relates to a tea-based beverage comprising probiotics, wherein the probiotics has a live probiotic cell count of ≥6.0 log CFU/ml. The invention further relates to a method of preparing the tea-based beverage having a live probiotic cell count of ≥6.0 log CFU/ml comprising the steps of: mixing tea infusion with sugar to form a mixture, inoculating probiotics to the mixture to form an inoculated mixture, fermenting the inoculated mixture for a pre-determined period of time to form the beverage. In one embodiment, the probiotics comprises *Lactobacillus plantarum, Lactobacillus acidophilus, Lactobacillus gasseri, Lactobacillus fermentum, Lactobacillus rhamnosus, Lactobacillus paracasei, Saccharomyces boulardii, Saccharomyces cerevisiae*, or a combination thereof.

14 Claims, 8 Drawing Sheets

(58) Field of Classification Search
USPC ............................................................ 426/52
See application file for complete search history.

(56) References Cited

FOREIGN PATENT DOCUMENTS

| | | |
|---|---|---|
| CN | 107455520 | 12/2017 |
| CN | 108634055 | 10/2018 |
| CN | 109576182 | 4/2019 |
| JP | 2006-254837 | 9/2006 |

OTHER PUBLICATIONS

Written Opinion of the ISA for PCT/SG2021/050419, mailed Aug. 23, 2021, 6 pages.
Teoh et al., "Yeast ecology of Kombucha fermentation", Int J Food Microbial, Sep. 1, 2004, vol. 95, No. 2, pp. 119-126.
Coton et al., "Unraveling microbial ecology of industrial-scale Kombucha fermentations by metabarcoding and culture- based methods", FEMS Microbial. Ecol, May 1, 2017, vol. 93, No. 5, pp. 1-16.
Majeed et al., "Evaluation of probiotic Bacillus coagulans MTCC 5856 viability after tea and coffee brewing and its growth in GIT hostile environment", Food Res Int, Dec. 4, 2018, vol. 121, pp. 497-505.
Notice of Reasons for Refusal in JP Application No. 2023-500382 issued Jun. 16, 2025 with English Translation.

* cited by examiner

Unfermented
L. plantarum
Co-Culture
S. cerevisiae
Concentration of amino acids (nmol)
0
500
1000
1500
2000
2500
Asp
Ser + Asn
Glu
NH3
Arg
Thr
Ala
Pro
Cys
Tyr
Val
Lys
Ile
Leu
Phe
Amino acids

TEA-BASED BEVERAGE

This application is the U.S. national phase of International Application No. PCT/SG2021/050419 filed Jul. 16, 2021, which designated the U.S. and claims priority to SG Patent Application No. 10202006784Q filed Jul. 16, 2020, the entire contents of each of which are hereby incorporated by reference.

TECHNICAL FIELD

The present invention relates to a tea-based beverage and a method of preparing the same.

BACKGROUND

As consumers get more health conscious, the popularity of functional food and beverages is increasing. These trends have spurred strong innovation in the probiotic foods marketplace, marking the appearance of a plethora of probiotic delivery formats including dairy, cereals, soy, fruits, vegetables, meat.

Tea is one of the most popular drinks in the world, which is famous for its bioactivities and delicate aroma. As consumers' focus shifts towards functional beverages, there is a need for a functional tea-based beverage. However, there are challenges in developing a probiotic tea beverage since a simple addition of fermentable substrates and/or biological agents may lead to the production of contents which may have a detrimental effect on the sensorial characteristics of tea.

There is therefore a need for an improved tea which may be considered a functional beverage.

SUMMARY OF THE INVENTION

The present invention seeks to address these problems, and/or to provide a tea-based beverage.

According to a first aspect, the present invention provides a tea-based beverage comprising probiotics, wherein the probiotics has a live probiotic cell count of ≥6.0 log CFU/mL. In particular, the beverage may be a fermented beverage.

According to a particular aspect, the probiotics comprised in the beverage may have a live probiotic cell count of ≥6.0 log CFU/mL after 3 months of storage. In particular, the beverage may have a live probiotic cell count of ≥7.0 log CFU/mL.

The probiotics comprised in the beverage may be any suitable probiotics. In particular, the probiotics may comprise, but is not limited to: a probiotic bacteria, a probiotic yeast, or a combination thereof. According to a particular aspect, the probiotics may comprise: probiotic lactic acid bacteria, bifidobacteria, probiotic *Saccharomyces* yeast, probiotic non-*Saccharomyces* yeast, or a combination thereof.

In particular, the probiotic lactic acid bacteria may be, but not limited to: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei*, or a combination thereof.

In particular, the probiotic *Saccharomyces* yeast may be, but not limited to: *Saccharomyces* (S.) *boulardii, S. cerevisiae*, or a combination thereof.

According to a particular aspect, the probiotics may comprise, but is not limited to: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei, Bifidobacterium* (B.) *lactis, Saccharomyces* (S.) *boulardii, S. cerevisiae*, or a combination thereof.

The beverage may further comprise an additive. The additive may be any suitable additive. For example, the additive may be, but not limited to, a sweetener, a stabilizer, a flavouring, or a combination thereof.

According to a second aspect, the present invention provides a method of preparing a tea-based beverage comprising probiotics having a live cell count of 6.0 log CFU/mL, the method comprising:

- mixing tea infusion with sugar to form a mixture;
- adding probiotics to the mixture to form an inoculated mixture; and
- fermenting the inoculated mixture for a pre-determined period of time to form the beverage.

The mixing may comprise mixing a suitable amount of sugar. According to a particular aspect, the mixing may comprise mixing sugar at a concentration of 0.01-10.0% w/v based on the total volume of the mixture.

The mixing may further comprise mixing yeast extract. The mixing may comprise mixing a suitable amount of yeast extract. According to a particular aspect, the mixing may comprise mixing yeast extract at a concentration of 0.01-5.0% w/v based on total volume of the mixture.

The adding probiotics may comprise adding any suitable probiotics. For example, the probiotics may be as described above in relation to the first aspect of the present invention.

According to a particular aspect, the adding may comprise adding probiotics to obtain an initial probiotic live count of 5-7 log CFU/mL.

The fermenting may be for a suitable pre-determined period of time. For example, the pre-determined period of time may be 4-100 hours.

The fermenting may be at a suitable temperature. For example, the fermenting may be at a temperature of 15-45° C.

The method may further comprise heating the mixture prior to the adding probiotics.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 2(*a*) shows changes in concentration of sucrose; FIG. 2(*b*) shows changes in concentration of glucose; and FIG. 2(*c*) shows changes in concentration of fructose; *L. plantarum* represents green tea infusion fermented with a monoculture of *Lactobacillus plantarum*

Figure 3:
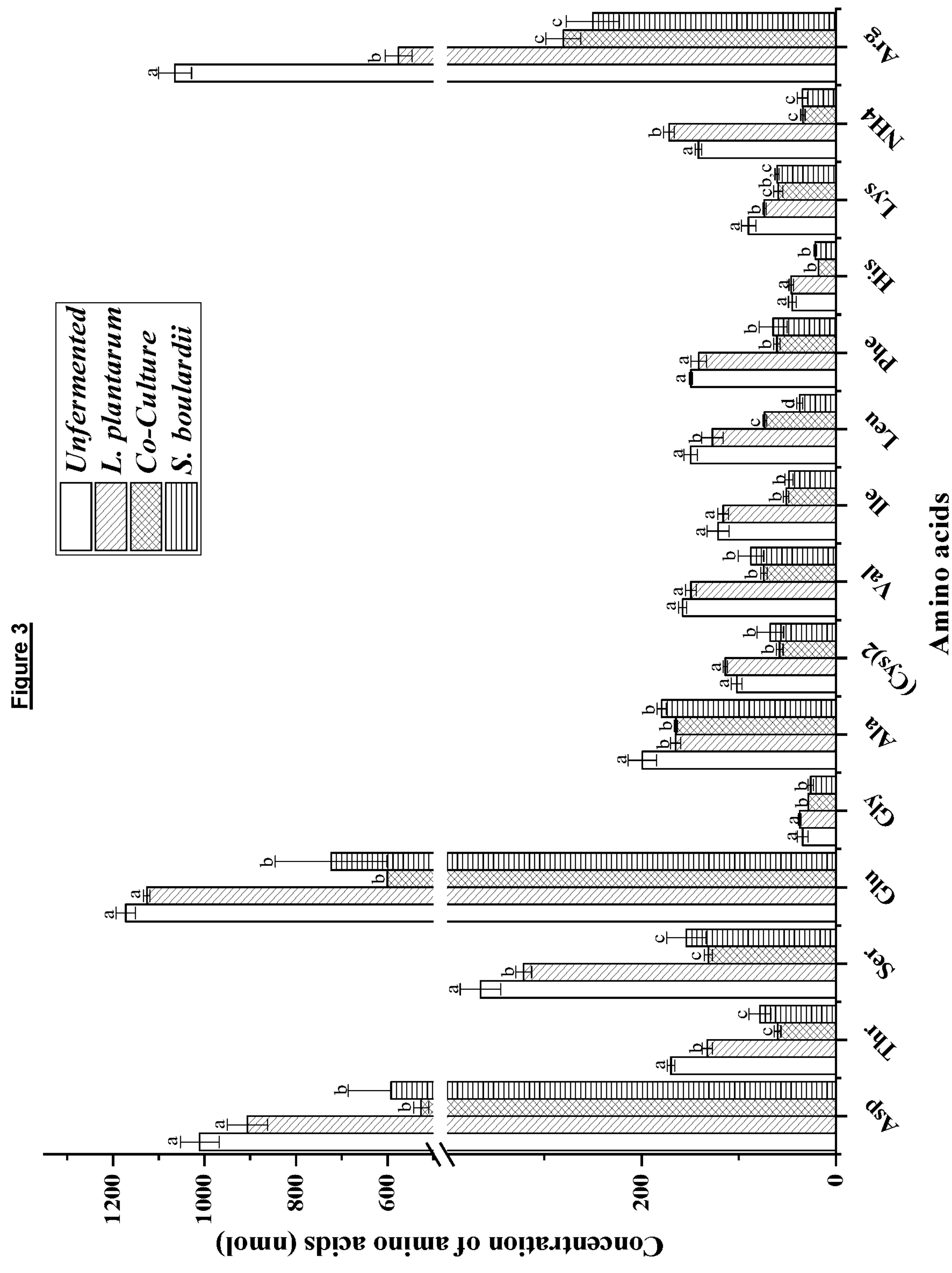
Figure 4:
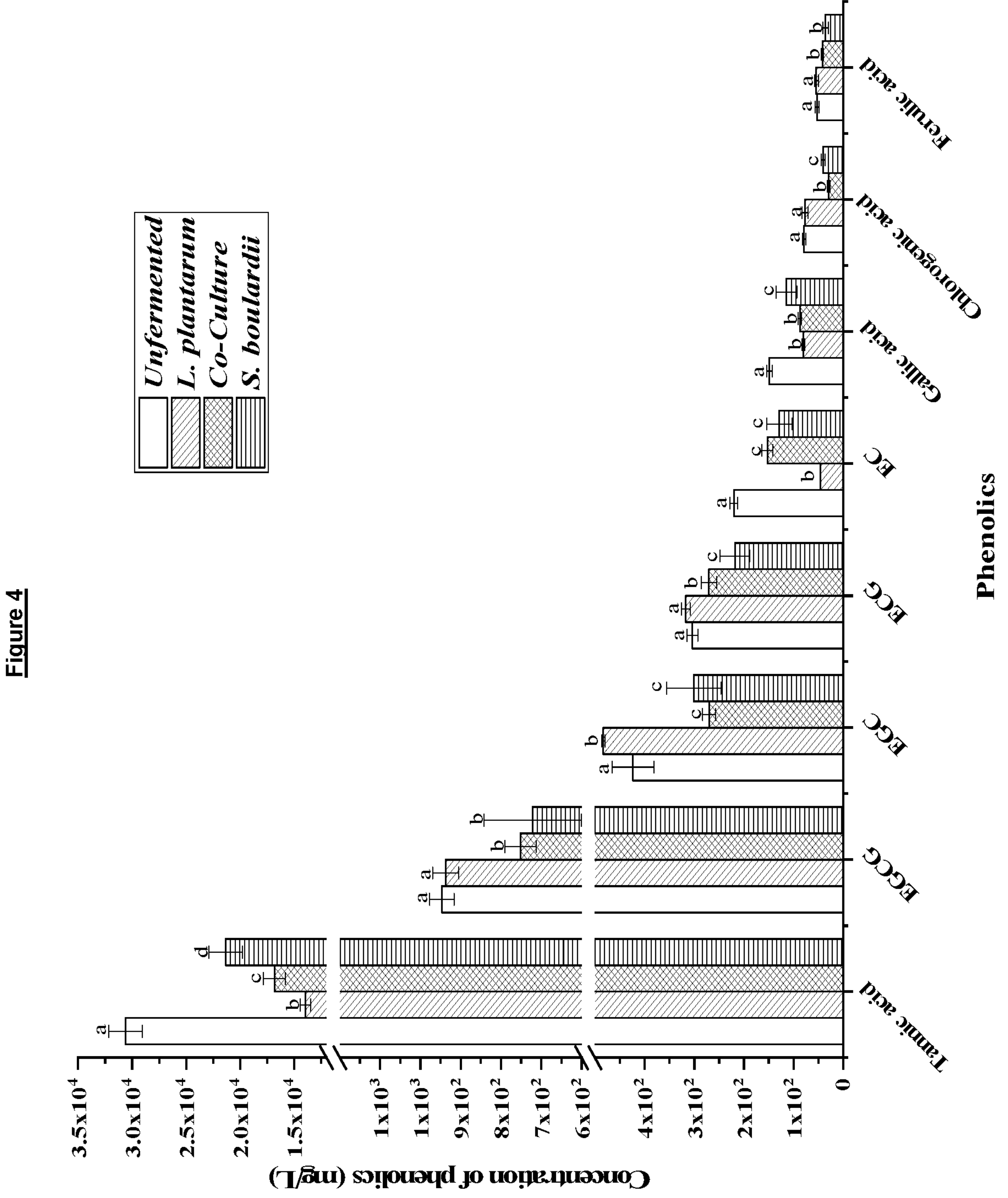
Figure 5:
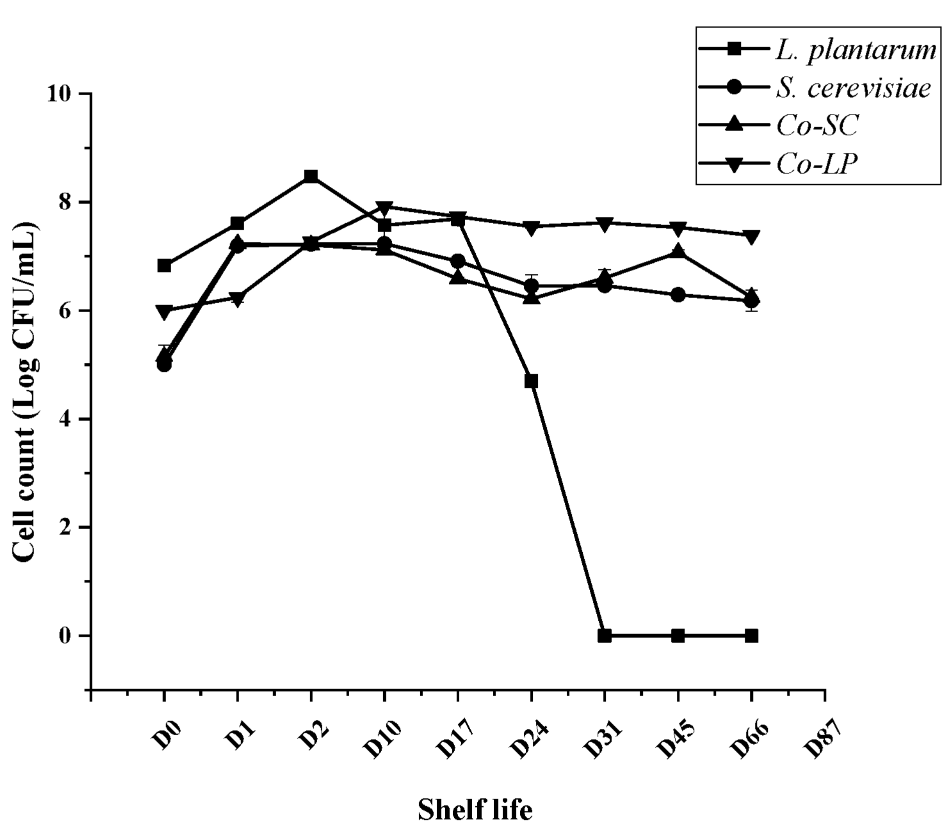
Figure 6:
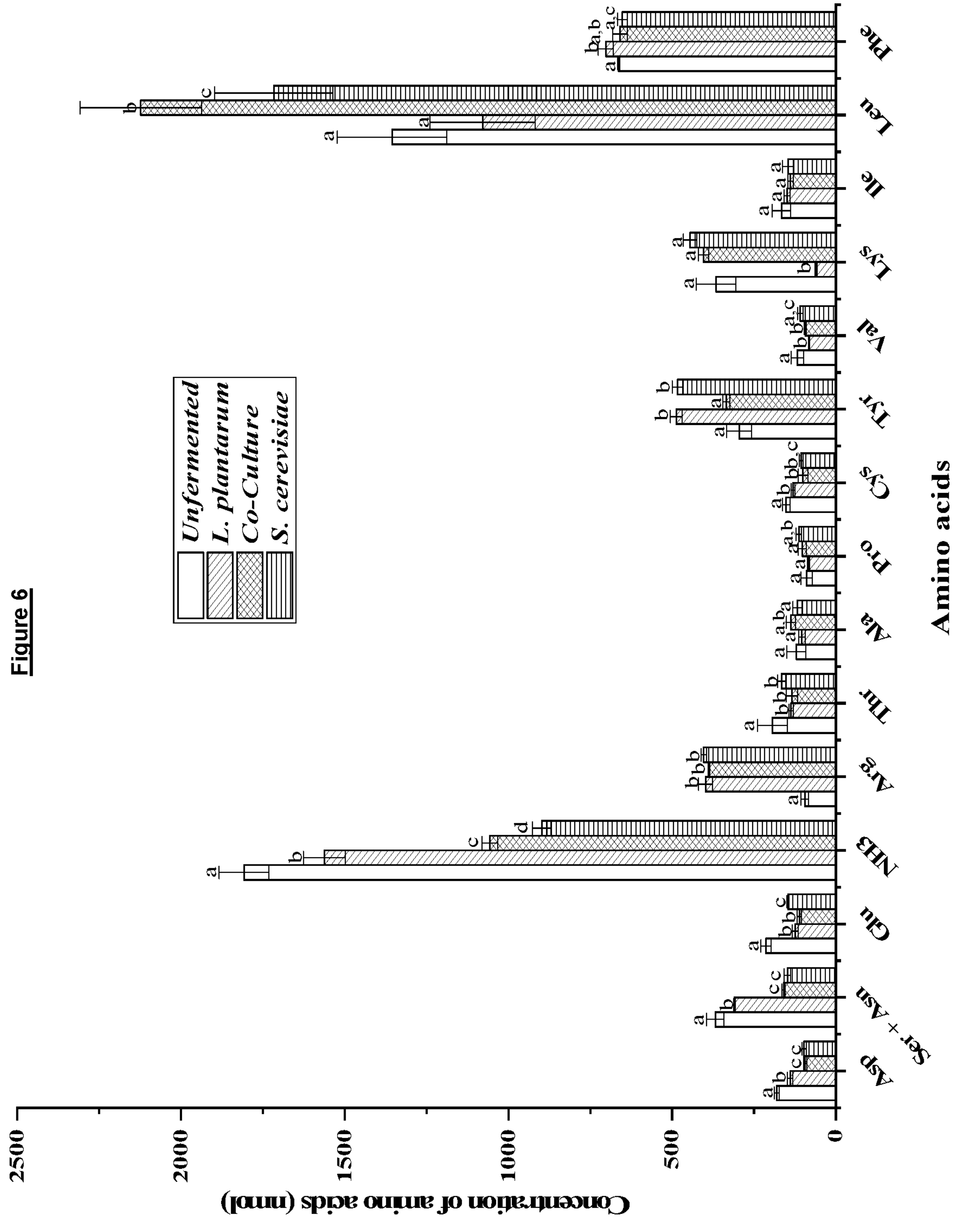
Figure 7:
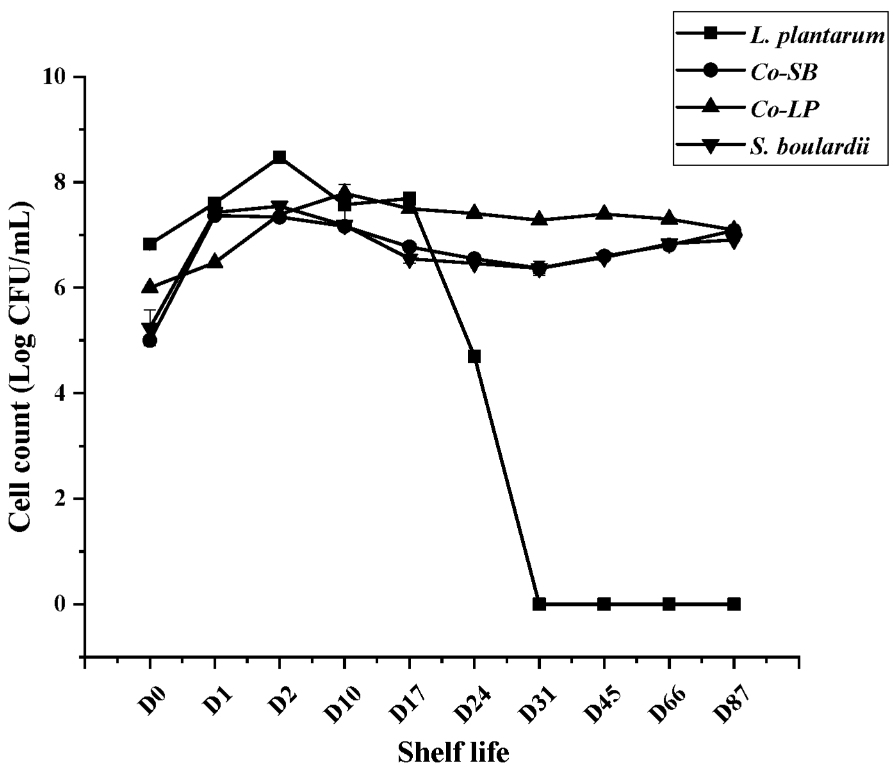
Figure 8:
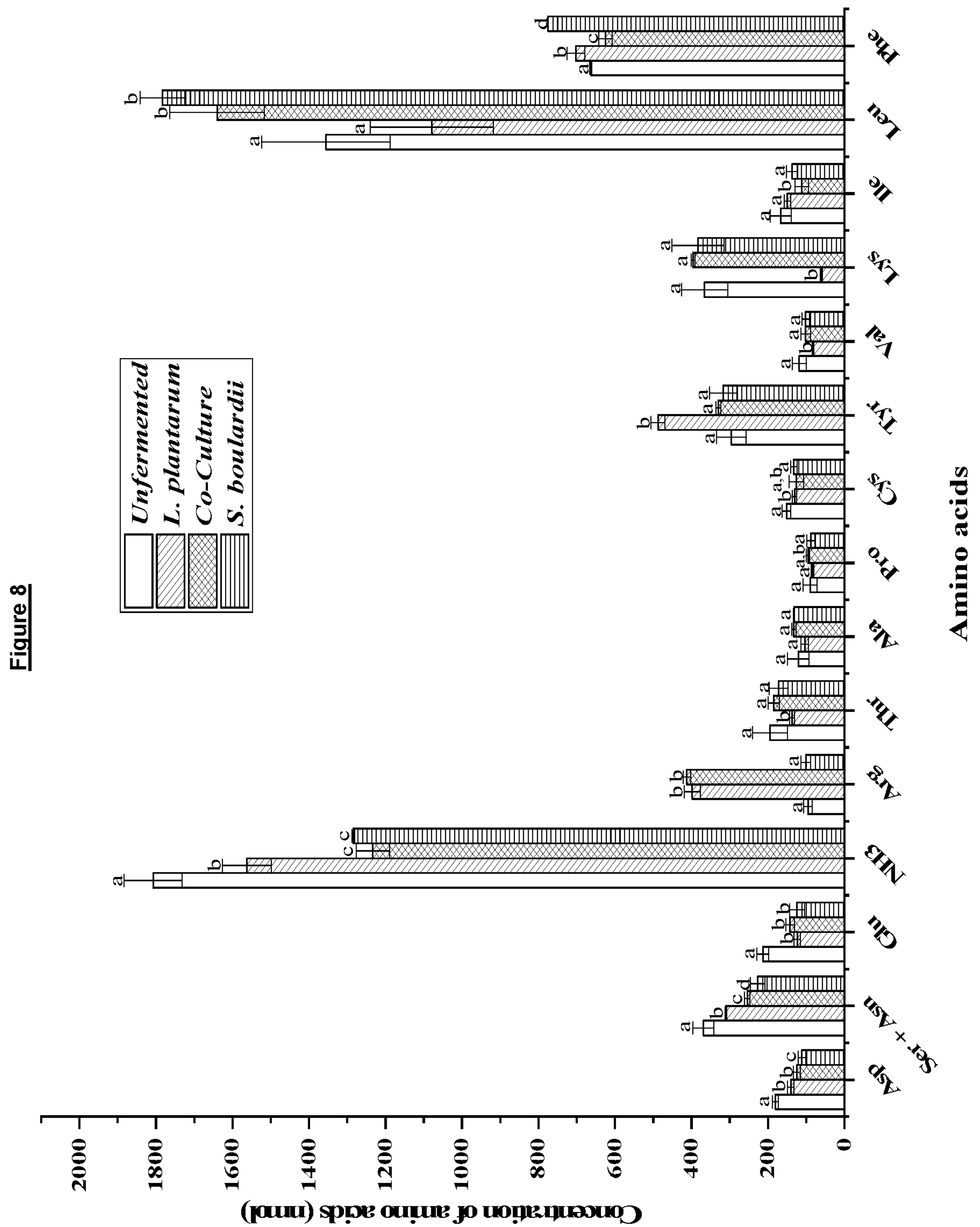

299V; Co-Culture represents green tea infusion fermented with *Lactobacillus plantarum* 299V and *Saccharomyces boulardii* CNCM-I745; *S. boulardii* represents green tea infusion fermented with a monoculture of *Saccharomyces boulardii* CNCM-I745; fermentations were done in triplicate (n=3);

FIG. 3 shows changes in amino acid composition during fermentation of green tea infusion with *Saccharomyces boulardii* CNCM I-745 and *Lactobacillus plantarum* 299V, and their combination; Unfermented represents sterilized green tea infusion without inoculation; *L. plantarum* represents green tea infusion fermented with a monoculture of *Lactobacillus plantarum* 299V; Co-Culture represents green tea infusion fermented with *Lactobacillus plantarum* 299V and *Saccharomyces boulardii* CNCM I-745; *S. boulardii* represents green tea infusion fermented with a monoculture of *Saccharomyces boulardii* CNCM I-745; fermentations were done in triplicate (n=3); values with a different letter are significantly different (P<0.05);

FIG. 4 shows changes in non-volatile phenolic compounds during fermentation of green tea infusion with *Saccharomyces boulardii* CNCM I-745 and *Lactobacillus plantarum* 299V, and their combination; Unfermented represents sterilized green tea infusion without inoculation; *L. plantarum* represents green tea infusion fermented with a monoculture of *Lactobacillus plantarum* 299V; Co-Culture represents green tea infusion fermented with *Lactobacillus plantarum* 299V and *Saccharomyces boulardii* CNCM I-745; *S. boulardii* represents green tea infusion fermented with a monoculture of *Saccharomyces boulardii* CNCM I-745; fermentations were done in triplicate (n=3); values with a different letter are significantly different (P<0.05);

FIG. 5 shows growth and survival of *Saccharomyces cerevisiae* CNCM I-3856 and *Lactobacillus plantarum* 299V, and their combination during fermentation and storage of black tea infusion; *L. plantarum* represents black tea infusion fermented with a monoculture of *Lactobacillus plantarum* 299V; Co-LP represents *Lactobacillus plantarum* 299V in co-culture media; Co-SC represents *Saccharomyces cerevisiae* CNCM I-3856 in co-culture media; *S. cerevisiae* represents black tea infusion fermented with a monoculture of *Saccharomyces cerevisiae* CNCM I-3856; cell counts are the mean values of triplicate fermentations (n=3), with error bars representing the standard deviation of the mean;

FIG. 6 shows changes in amino acid composition of black tea infusion during fermentation with *Saccharomyces cerevisiae* CNCM I-3856 and *Lactobacillus plantarum* 299V, and their combination; Unfermented represents sterilized black tea infusion without inoculation; *L. plantarum* represents black tea infusion fermented with a monoculture of *Lactobacillus plantarum* 299V; Co-culture represents black tea infusion fermented with *Lactobacillus plantarum* 299V and *Saccharomyces cerevisiae* CNCM I-3856; *S. cerevisiae* represents black tea infusion fermented with a monoculture of *Saccharomyces cerevisiae* CNCM I-3856; fermentations were done in triplicate (n=3), with error bars representing the standard deviation of the mean; values with a different letter are significantly different (P<0.05);

FIG. 7 shows growth and survival of *Saccharomyces boulardii* CNCM I-745 and *Lactobacillus plantarum* 299V, and their combination during fermentation and storage of black tea infusion; *L. plantarum* represents black tea infusion fermented with a monoculture of *Lactobacillus plantarum* 299V; Co-LP represents *Lactobacillus plantarum* 299V in co-culture medium; Co-SB represents *Saccharomyces boulardii* CNCM I-745 in co-culture medium; *S. boulardii* represents black tea infusion fermented with a monoculture of *Saccharomyces boulardii* CNCM I-745; cell counts are the mean values of triplicate fermentations (n=3), with error bars representing the standard deviation of the mean; and FIG. 8 shows changes in amino acid compositions of black tea infusion during fermentation with *Saccharomyces boulardii* CNCM I-745 and *Lactobacillus plantarum* 299V, and their combination; *L. plantarum* represents black tea infusion fermented with a monoculture of *Lactobacillus plantarum* 299V; Co-culture represents black tea infusion fermented with *Lactobacillus plantarum* 299V and *Saccharomyces boulardii* CNCM I-745; *S. boulardii* represents black tea infusion fermented with a monoculture of *Saccharomyces boulardii* CNCM 1745; fermentations were done in triplicate (n=3), with error bars representing the standard deviation of the mean, values with a different letter are significantly different (P<0.05).

DETAILED DESCRIPTION

As explained above, there is a need for a tea-based functional beverage. The present invention provides a tea-based functional beverage and a method of forming the functional tea-based beverage.

In general terms, the present invention provides a high value-added tea-based beverage with functional properties. In particular, the present invention provides a tea-based beverage comprising high probiotics live counts, which may be sustained at room temperatures for a period of time, making the beverage feasible for long-term transport or storage. Further, the flavours of the tea are preserved, or even enhanced in the beverage while providing additional therapeutic benefits compared to regular tea-based beverages.

According to a first aspect, the present invention provides a tea-based beverage comprising probiotics, wherein the probiotics has a live probiotic cell count of ≥6.0 log CFU/mL. The live probiotic cell count provided may be the live and active probiotic cell count. The live probiotic cell count provided may be the cell count at the time the beverage is prepared.

The beverage may be a fermented beverage. In particular, the beverage may be a fermented probiotic beverage. For the purposes of the present invention, the term probiotic beverage refers to a beverage comprising live and active vegetative probiotic cells. In particular, the probiotic cells are metabolically active.

For the purposes of the present invention, probiotics may include live and active microorganisms which upon ingestion in certain numbers exert health benefits beyond inherent general nutrition. The health benefits delivered by probiotics may mainly be due to their ability to populate gastrointestinal tract, contributing to establishing a healthy and balanced intestinal microflora.

A suitable amount of probiotics may be comprised in the beverage at any time from the preparation of the beverage and during the shelf-life of the beverage. For example, the probiotics may have a live cell count of ≥6.0 log CFU/mL. According to a particular aspect, the probiotics may have a live cell count of ≥7.0 log CFU/mL. Even more in particular, the probiotics may have a live cell count of ≥7.5 log CFU/mL.

In particular, the probiotics comprised in the beverage may have a live cell count of 6.0-9.5 log CFU/mL, 6.5-9.0 log CFU/mL, 7.0-8.5 log CFU/mL, 7.5-8.0 log CFU/mL. Even more in particular, the probiotics comprised in the beverage may have a live cell count of about 6.0-9.0 log CFU/m L.

According to a particular aspect, the beverage may be a stable beverage even after a period of time of storage. For example, the probiotics comprised in the beverage may have a live probiotic cell count of ≥6.0 log CFU/mL even after 3 months of storage. In particular, the live probiotic cell count may be 6.0-9.0 log CFU/mL, 6.5-8.5 log CFU/mL, 7.0-8.0 log CFU/mL, 7.2-7.5 log CFU/mL. Even more in particular, the live probiotic cell count may be 6.0-8.0 log CFU/mL. Accordingly, it can be seen that the beverage may still confer health benefits to the consumer even after a certain period of time following the manufacture of the beverage. Thus, the beverage may have a suitable shelf-life.

The probiotics comprised in the beverage may be any suitable probiotic. For example, the probiotics may be, but not limited to, a probiotic bacteria, a probiotic yeast, or a combination thereof. According to a particular aspect, the probiotics comprised in the beverage may be at least one type of probiotic bacteria. According to another particular aspect, the probiotics comprised in the beverage may be at least one type of probiotic yeast. According to another particular aspect, the probiotics comprised in the beverage may be at least one type of probiotic bacteria and at least one type of probiotic yeast. For example, the probiotics may comprise, but is not limited to, probiotic lactic acid bacteria, bifidobacteria, probiotic *Saccharomyces* yeast, probiotic non-*Saccharomyces* yeast, or a combination thereof.

The probiotic lactic acid bacteria may be any suitable probiotic lactic acid bacteria. For example, the probiotic lactic acid bacteria may be, but not limited to: *Lactobacillus* (Lb.) *rhamnosus, Lactobacillus* (Lb.) *paracasei, Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei*, or a combination thereof. In particular, the probiotic lactic acid bacteria may be Lb. *plantarum* 299v, Lb. *acidophilus* NCFM, Lb. *gasseri* Lac-343, Lb. *fermentum* PCC, or a combination thereof.

The probiotic *Saccharomyces* yeast may be any suitable probiotic *Saccharomyces* yeast. For example, the probiotic *Saccharomyces* yeast may be, but not limited to: *Saccharomyces* (S.) *boulardii, Saccharomyces* (S.) *cerevisiae*, or a combination thereof. In particular, the probiotic *Saccharomyces* yeast may be, but not limited to: *S. boulardii* CNCM-I745, *S. cerevisiae* CNCM I-3856, or a combination thereof.

According to a particular aspect, the probiotics may comprise, but is not limited to: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei, Bifidobacterium* (B.) *lactis, Saccharomyces* (S.) *boulardii, Saccharomyces* (S.) *cerevisiae*, or a combination thereof. In particular, the probiotics may comprise, but is not limited to: Lb. *plantarum* 299v, Lb. *acidophilus* NCFM, Lb. *gasseri* Lac-343, Lb. *fermentum* PCC, *S. boulardii* CNCM-I745, *S. cerevisiae* CNCM I-3856, or a combination thereof.

According to a particular aspect, the probiotics may comprise a combination of probiotic *Saccharomyces* yeast with at least one probiotic lactic acid bacteria. The probiotic lactic acid bacteria may be as described above. In particular, the probiotics may comprise a combination of probiotic *Saccharomyces* yeast with at least one of *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei, Bifidobacterium* (B.) *lactis*, or a combination thereof. For example, the probiotics may comprise a combination of *Saccharomyces* yeast with at least one of Lb. *plantarum* 299v, Lb. *acidophilus* NCFM, Lb. *gasseri* Lac-343, Lb. *fermentum* PCC. The probiotic *Saccharomyces* yeast may be *Saccharomyces* (S.) *boulardii, Saccharomyces* (S.) *cerevisiae*, or a combination thereof. In particular, the probiotic *Saccharomyces* yeast may be, but not limited to: *S. boulardii* CNCM-I745, *S. cerevisiae* CNCM I-3856, or a combination thereof.

The beverage may further comprise an additive. The additive may be any suitable additive. The additive may be any suitable additive for giving a more finished consumer product, for enhancing the flavour profile of the beverage and/or for enhancing the organoleptic properties of the beverage. For example, the additive may be, but not limited to, a sweetener, a stabilizer, a flavouring, or a combination thereof.

The beverage may comprise increased amounts of odourants such as, but not limited to, ethyl esters which impart fruity aromas, green leaf alcohols such as 1-hexanol, 2-heptanol and 3-hexenol which impart sweet, fruity, green, leafy aroma, aromatic alcohols such as 2-phenylethyl alcohol which impart rose-like and floral aroma, and acetoin which impart buttery or butterscotch aroma, as compared to unfermented tea beverages. The increased amounts of these odourants may contribute to the enhancement of the flavour profile of the tea-based beverage.

According to a second aspect, the present invention provides a method of preparing a tea-based beverage comprising probiotics having a live cell count of ≥6.0 log CFU/mL, the method comprising:

- mixing tea infusion with probiotic nutrients to form a mixture;
- adding probiotics to the mixture to form an inoculated mixture; and
- fermenting the inoculated mixture for a pre-determined period of time to form the beverage.

The method may be a method for forming the tea-based beverage according to the first aspect described above.

The method may be a method for forming a tea-based beverage comprising probiotics having a live cell count of ≥7.0 log CFU/mL.

The tea infusion may be any suitable tea infusion. For example, the tea infusion may comprise, but not limited to, a tea extract, tea powder, tea leaves, or a combination thereof. According to a particular aspect, the tea infusion may be formed from fresh or dried tea leaves. The tea leaves may not have undergone oxidation or fermentation. The tea infusion may be formed of one or more of any suitable tea such as but not limited to, green tea, black tea, white tea, yellow tea, oolong. In particular, the tea infusion may comprise green tea, black tea, or a combination thereof.

The probiotic nutrients may be any suitable nutrients which provide a suitable environment to encourage probiotic cell growth. For example, the probiotic nutrients may comprise, but is not limited to, sugar, inactivated yeast derivatives, yeast extracts, or a combination thereof.

According to a particular aspect, the mixing may comprise mixing tea infusion with sugar. The sugar may be any suitable sugar. For example, the sugar may be a fermentable sugar such as, but not limited to, glucose, sucrose, fructose, or a combination thereof. According to a particular aspect, the sugar may be glucose. The addition of the sugar may be for increasing carbohydrate content in the mixture, as well as to increase microbial growth in the mixture during fermentation.

The mixing may comprise mixing a suitable amount of sugar. According to a particular aspect, the mixing may comprise mixing sugar at a concentration of 0.01-10.0% w/v based on the total volume of the mixture. In particular, the sugar mixed may be at a concentration of 0.05-9.0% w/v, 0.1-8.0% w/v, 0.2-7.0% w/v, 0.25-6.0% w/v, 0.3-5.0% w/v, 0.4-4.0% w/v, 0.45-3.0% w/v, 0.5-2.0% w/v, 0.6-1.0% w/v, 0.7-0.9% w/v, 0.75-0.8% w/v based on the total volume of the mixture. Even more in particular, the sugar may be glucose and may be mixed at a concentration of 0.25-0.5 vol % based on the total volume of the mixture.

According to a particular aspect, the mixing may further comprise mixing the tea infusion and sugar mixture with yeast extract. The yeast extract may be any suitable yeast extract. The yeast extract may comprise cell content of yeast without cell walls.

The mixing may comprise mixing a suitable amount of yeast extract. According to a particular aspect, the mixing may comprise mixing yeast extract at a concentration of 0.01-5.0% w/v based on total volume of the mixture. In particular, the yeast extract mixed may be at a concentration of 0.02-3.0% w/v, 0.03-2.5% w/v, 0.04-2.0% w/v, 0.05-1.5% w/v, 0.06-1.0% w/v, 0.07-0.9% w/v, 0.08-0.8% w/v, 0.09-0.7% w/v, 0.1-0.6% w/v, 0.2-0.5% w/v, 0.3-0.4% w/v based on the total volume of the mixture. Even more in particular, the yeast extract mixed may be at a concentration of 0.03-0.06% w/v based on the total volume of the mixture.

The inactivated yeast derivative (IYD) may be any suitable IYD. For the purposes of the present invention, a IYD may comprise thermally or enzymatically inactivated yeast extracts. IYD may comprise, but is not limited to, yeast cell walls and yeast autolysates.

The mixing may comprise mixing a suitable amount of inactivated yeast derivative, According to a particular aspect, the mixing may comprise mixing inactivated yeast derivative at a concentration of 0.005-5.0% w/v based on total volume of the mixture. In particular, the inactivated yeast derivative mixed may be at a concentration of 0.01-5.0% w/v, 0.02-3.0% w/v, 0.03-2.5% w/v, 0.04-2.0% w/v, 0.05-1.5% w/v, 0.06-1.0% w/v, 0.07-0.9% w/v, 0.08-0.8% w/v, 0.09-0.7% w/v, 0.1-0.6% w/v, 0.2-0.5% w/v, 0.3-0.4% w/v based on the total volume of the mixture. Even more in particular, the inactivated yeast derivative mixed may be at a concentration of 0.03-0.06% w/v based on the total volume of the mixture.

The mixing may be by any suitable means. For example, the mixing may comprise stirring the mixture.

The method may further comprise heating the mixture at a suitable temperature prior to the adding probiotics to the mixture. The heating may comprise mild pasteurization or sterilisation of the mixture. The heating may lead to total inactivation of residual and/or wild microorganisms prior to the adding probiotics, thereby reducing indigenous microbial activity in the mixture. Further, the heating may enable complete control of the microflora during the fermenting and therefore result in a better beverage quality.

The heating may be carried out at a temperature of about 50-150° C. In particular, the temperature may be about 60-130° C., 75-120° C., 80-115° C., 90-100° C. Even more in particular, the temperature may be about 120-125° C.

The heating may be carried out for a suitable period of time. For example, the hearing may be for 10-60 minutes. In particular, the heating may be for about 12-45 minutes, 15-40 minutes, 20-35 minutes, 25-30 minutes. Even more in particular, the heating may be for about 12-15 minutes.

The heating may be by any suitable means. For example, the heating may be in a water bath.

The method may further comprise cooling the mixture prior to the adding probiotics. In particular, the cooling may comprise cooling the mixture to ambient temperature, for example about 25° C.

The adding probiotics may comprise adding any suitable probiotics to the mixture. For example, the probiotics may comprise, but not limited to, a probiotic bacteria, a probiotic yeast, or a combination thereof. According to a particular aspect, the probiotics added to the mixture may be at least one type of probiotic bacteria. According to another particular aspect, the probiotics added to the mixture may be at least one type of probiotic yeast. According to another particular aspect, the probiotics added to the mixture may be at least one type of probiotic bacteria and at least one type of probiotic yeast. For example, the probiotics added may comprise, but is not limited to, probiotic lactic acid bacteria, bifidobacteria, probiotic *Saccharomyces* yeast, probiotic non-*Saccharomyces* yeast, or a combination thereof.

The probiotic lactic acid bacteria added may be any suitable probiotic lactic acid bacteria. For example, the probiotic lactic acid bacteria may be, but not limited to: *Lactobacillus* (Lb.) *rhamnosus, Lactobacillus* (Lb.) *paracasei, Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei*, or a combination thereof. In particular, the probiotic lactic acid bacteria added may be Lb. *plantarum* 299v, Lb. *acidophilus* NCFM, Lb. *gasseri* Lac-343, Lb. *fermentum* PCC, or a combination thereof.

The probiotic *Saccharomyces* yeast added may be any suitable probiotic *Saccharomyces* yeast. For example, the probiotic *Saccharomyces* yeast may be, but not limited to: *Saccharomyces* (S.) *boulardii, Saccharomyces* (S.) *cerevisiae*, or a combination thereof. In particular, the probiotic *Saccharomyces* yeast may be, but not limited to: *S. boulardii* CNCM-I745*, S. cerevisiae* CNCM I-3856, or a combination thereof.

According to a particular aspect, the probiotics added may comprise, but is not limited to: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei, Bifidobacterium* (B.) *lactis, Saccharomyces* (S.) *boulardii, Saccharomyces* (S.) *cerevisiae*, or a combination thereof. In particular, the probiotics may comprise, but is not limited to: Lb. *plantarum* 299v, Lb. *acidophilus* NCFM, Lb. *gasseri* Lac-343, Lb. *fermentum* PCC, *S. boulardii* CNCM-I745*, S. cerevisiae* CNCM I-3856, or a combination thereof.

According to a particular aspect, the probiotics added may comprise a combination of probiotic *Saccharomyces* yeast with at least one probiotic lactic acid bacteria. The probiotic lactic acid bacteria may be as described above. In particular, the probiotics may comprise a combination of probiotic *Saccharomyces* yeast with at least one of *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei, Bifidobacterium* (B.) *lactis*. For example, the probiotics may comprise a combination of *Saccharomyces* yeast with at least one of Lb. *plantarum* 299v, Lb. *acidophilus* NCFM, Lb. *gasseri* Lac-343, Lb. *fermentum* PCC. The probiotic *Saccharomyces* yeast may be *Saccharomyces* (S.) *boulardii, Saccharomyces* (S.) *cerevisiae*, or a combination thereof. In particular, the probiotic *Saccharomyces* yeast may be, but not limited to: *S. boulardii* CNCM-I745*, S. cerevisiae* CNCM I-3856, or a combination thereof.

When the adding comprises adding a combination of probiotics, the two or more probiotics may be added simultaneously or sequentially into the mixture. According to a particular aspect, the two or more probiotics may be added to the mixture simultaneously. In particular, the first and second or subsequent probiotics are all added to the mixture at the same time.

According to another particular aspect, the two or more probiotics may be added sequentially. In particular, the adding probiotics may comprise adding a first probiotics to the mixture followed by adding a second or subsequent probiotics after a pre-determined period of time after the addition of the first probiotics.

The adding probiotics may comprise adding a suitable amount of probiotics. According to a particular aspect, the adding probiotics may comprise adding probiotics to obtain an initial probiotic live count of at least 1 log CFU/mL. For example, the amount of probiotics added may be at least 4 log CFU/mL. In particular, the amount of probiotics added may be about 5-7 log CFU/mL, preferably 5.5-6.5 log CFU/mL, 5.7-6 log CFU/mL. Even more in particular, the amount of probiotics added may be 4.5-7.0 log CFU/mL.

The adding probiotics may be under suitable conditions. For example, the adding probiotics may be in an aseptic setup.

The fermenting may be carried out under any suitable conditions. For example, the fermenting may be for a pre-determined period of time. The pre-determined period of time may be any suitable period of time for the purposes of the present invention. The pre-determined period of time may be dependent on the probiotics added in the adding probiotics. According to a particular aspect, the pre-determined period of time may be 4-100 hours. For example, the pre-determined period of time may be 4-96 hours, 5-72 hours, 6-60 hours, 12-54 hours, 18-48 hours, 24-42 hours, 30-36 hours. In particular, the pre-determined period of time may be about 36-48 hours. Even more in particular, the pre-determined period of time may be about 48 hours.

The fermenting may be at a pre-determined temperature. The pre-determined temperature may be any suitable temperature for the purposes of the present invention.

According to a particular aspect, the pre-determined temperature may be 15-45° C. For example, the pre-determined temperature may be 20-40° C., 25-37° C., 30-35° C. In particular, the pre-determined temperature may be about 25-30° C. Even more in particular, the pre-determined temperature may be about 30° C. The temperature may be changed at any point during the fermenting.

The method may further comprise adding an additive to the mixture and/or beverage. The additive may be any suitable additive. In particular, the additive may be for enhancing the flavour profile of the beverage and/or for enhancing the organoleptic properties of the beverage. For example, the additive may be, but not limited to, a sweetener, a stabilizer, a flavouring, or a combination thereof.

According to a particular aspect, the formed tea-based beverage may be stored at a suitable temperature following the fermentation. For example, the beverage may be stored at a temperature of ≤30° C. In particular, the beverage may be stored at a temperature of about ≤25° C. Even more in particular, the beverage may be stored at a temperature of about 20-25° C.

Having now generally described the invention, the same will be more readily understood through reference to the following embodiment which is provided by way of illustration, and is not intended to be limiting.

EXAMPLES

Example 1—*Saccharomyces boulardii* CNCM I-745 and *Lactobacillus plantarum* 299V Fermented Green Tea Infusion Materials and Method Green tea infusion (5% w/w) with 0.5% glucose and 0.06% Opti-White yeast extract was sterilized at 121° C. for 15 minutes, then cooled to room temperature. Fermentation of green tea infusion was conducted by inoculating green tea infusion with a monoculture of *Saccharomyces boulardii* CNCM I-745 or *Lactobacillus plantarum* 299V, or a co-culture of these two microorganisms to obtain an initial cell population of approximately 5-7 log CFU/mL for both the yeast and lactic acid bacteria (LAB) in the medium. Fermentation was conducted at 30° C. for 2 days, then transferred to room temperature (25° C.) for 85 days.

Sterilized green tea infusion with no microbial fermentation/inoculation was incubated under the same conditions and used as the control. For both fermented and unfermented green teas, instrumental analyses on volatiles and non-volatiles were conducted.

Results

Figure 1:
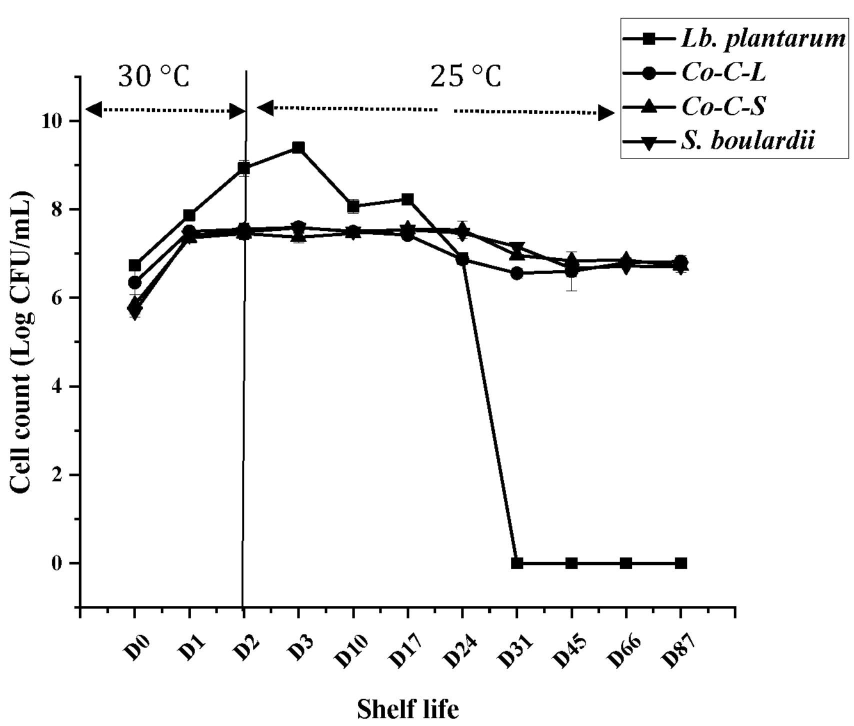
FIG. 1 shows the growth and survival of *Saccharomyces boulardii* CNCM-I745 and *Lactobacillus plantarum* 299V during fermentation and storage of green tea infusion. *L. plantarum* represents green tea infusion fermented with a monoculture of *Lactobacillus plantarum* 299V; Co-C-L represents *Lactobacillus plantarum* 299V in co-culture medium; Co-C-S represents *Saccharomyces boulardii* CNCM-I745 in co-culture medium; *S. boulardii* represents green tea infusion fermented with a monoculture of *Saccharomyces boulardii* CNCM-I745; cell counts are the mean values of triplicate fermentations (n=3), with error bars representing the standard deviation of the mean.

FIG. 1 shows the viable cell count kinetics of *S. boulardii* and *L. plantarum* in both mono- and co-cultured green tea infusion media during fermentation and storage. The extent of *L. plantarum* growth differed in mono- and co-cultures during fermentation.

For *L. plantarum* monoculture, an increase in cell count of 2.5 log CFU/mL was achieved within 3 days, which then decreased gradually till day 24 followed by a sharp decrease to undetectable levels on day 31. For *L. plantarum* in co-culture medium, an increase in cell population of about 1.5 log CFU/mL was achieved within one day, and remained stable for the next 86 days.

Compared to the *L. plantarum* monoculture in green tea infusion, co-culturing the LAB with *S. boulardii* extended its survival significantly. The *S. boulardii* in both mono- and co-cultured tea showed similar growth and survival patterns. Yeast cell count increased by 2 log CFU/mL within one day and remained stable for the next 86 days (FIG. 1).

Figure 2A:
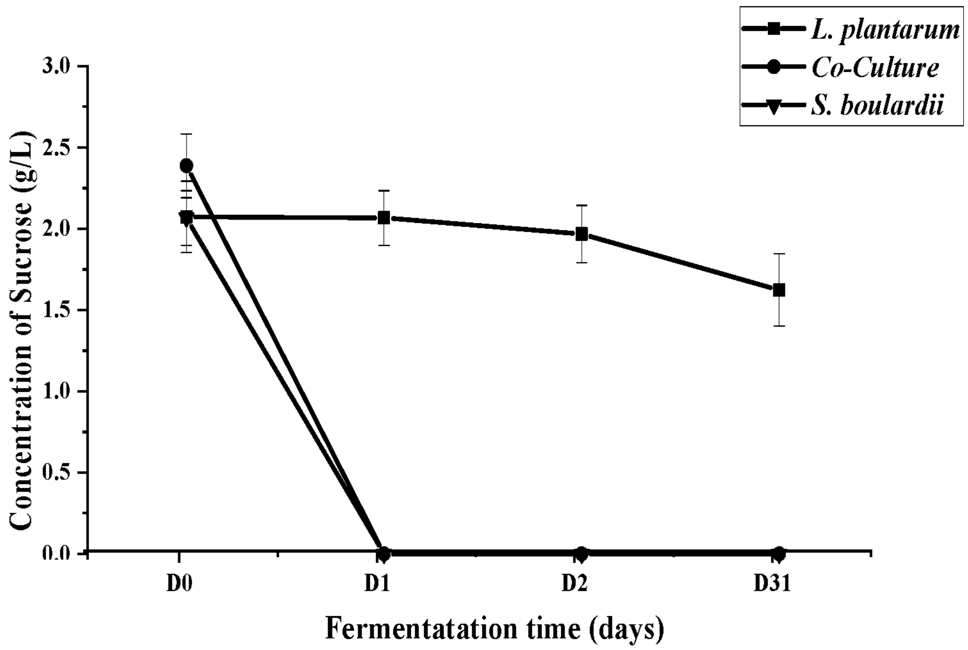
FIG. 2 shows changes in sugars levels during fermentation of green tea infusion with *Saccharomyces boulardii* CNCM-I745 and *Lactobacillus plantarum* 299V, and their combination.
Figure 2B:
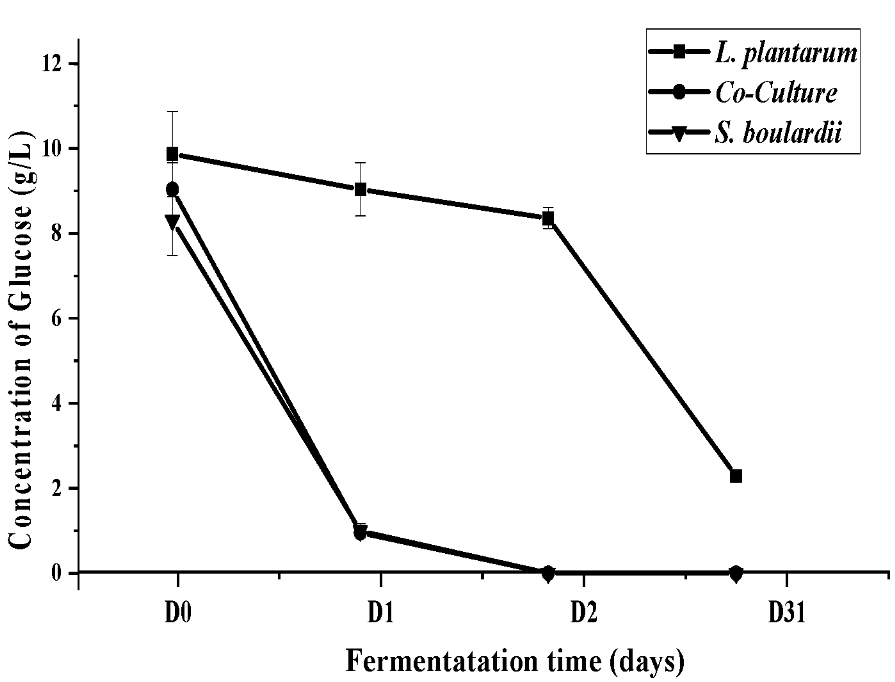
Figure 2C:
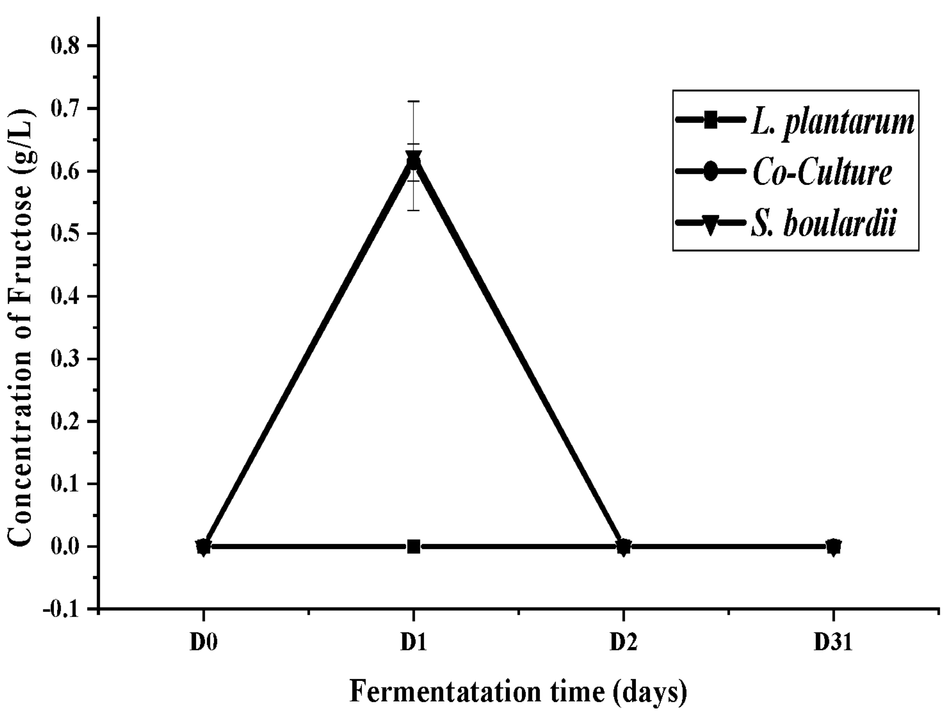

The depletion of sucrose in the green tea coincided with an accumulation of fructose within one day in both *S. boulardii* mono- and co-culture fermentations. This indicates that sucrose was broken down into fructose and glucose by *S. boulardii*, and these two monosaccharides were completely consumed by the yeast in its monoculture within 2 days (FIGS. 2(*a*)-(*c*)).

As for *L. plantarum*, glucose was the main carbon source as it was unable to utilize sucrose efficiently. The metabolism of glucose by *L. plantarum* led to a sharp decrease in glucose content within 24 hours and an increase in lactic acid concentration (Table 1).

TABLE 1

Changes in organic acids during fermentation of green tea infusion with yeast and bacteria

| Organic acids | | L. plantarum^ | | S. boulardii# | | Co-Culture& | |
|---|---|---|---|---|---|---|---|
| (g/L) | Unfermented* | Day 2 | Day 31 | Day 2 | Day 31 | Day 2 | Day 31 |
| Lactic acid | 4.48 ± 0.40a | 5.24 ± 0.19b | 5.12 ± 0.04b | 2.57 ± 0.6c | 3.22 ± 0.22d | 2.94 ± 0.37c | 3.65 ± 0.14d |
| Malic acid | 0.3 ± 0.03a | 0.3 ± 0.03a | 0.27 ± 0.08a | 0.18 ± 0.03b | 0.24 ± 0.01a | 0.19 ± 0.02b | 0.24 ± 0.01a |

*Sterilized green tea infusion without inoculation;
^Green tea infusion fermented with a monoculture of *Lactobacillus plantarum* 299V;
#Green tea infusion fermented with a monoculture of *S. boulardii*;
&Green tea infusion fermented with *Lactobacillus plantarum* 299V and *Saccharomyces boulardii* CNCM I-745.
Fermentations were done in triplicate (n = 3).
Values with a different letter are significantly different (P < 0.05).

Amino acids were consumed to a greater degree by *S. boulardii* than *L. plantarum* (FIG. 3), which was related to generation of aroma compounds, such as 2-phenylethyl alcohol and acetoin (Table 2) by these microorganisms.

The metabolic activities of *S. boulardii* also led to a significantly lower content of non-volatile phenolic compounds in green tea as compared to *L. plantarum* (FIG. 4).

The volatiles associated with the metabolic activities of the yeast, LAB and their combination during the fermentation of green tea infusion are shown in Table 2. Ethyl esters with fruity notes arising from the metabolism of *S. boulardii* were generated to a higher level in both the single yeast and co-culture of yeast than the LAB alone. Compared to single yeast and LAB fermentations, co-inoculation of *S. boulardii* and *L. plantarum* generated greater amounts of esters and alcohols, such as methyl salicylate, benzyl alcohol, geraniol and 2-phenylethyl alcohol.

TABLE 2

Changes in key volatiles (peak area × $10^5$) associated with *Saccharomyces boulardii* CNCM I-745 and *Lactobacillus plantarum* 299V fermentations of green tea infusion

| | | L. plantarum^ | | S. boulardii# | | Co-Culture& | |
|---|---|---|---|---|---|---|---|
| Compound | Unfermented* | Day 2 | Day 31 | Day 2 | Day 31 | Day 2 | Day 31 |
| D-Limonene | 0.49 ± 0.26a | 0.36 ± 0.03a | 0.33 ± 0.04a | 0.60 ± 0.08b | 0.12 ± 0.02c | 0.48 ± 0.06a | 0.08 ± 0.00c |
| Hexanoic acid, ethyl ester | ND | ND | ND | 0.59 ± 0.04a | 0.10 ± 0.03b | 0.62 ± 0.13a | ND |
| Acetoin | ND | 0.71 ± 0.10 | ND | ND | ND | ND | ND |
| 1-Hexanol | ND | 0.35 ± 0.03a | 0.24 ± 0.02b | ND | ND | ND | ND |
| 3-Hexen-1-ol, (E)- | ND | 5.51 ± 1.00c | 3.23 ± 0.12c | 1.07 ± 0.10a | 2.22 ± 0.16b | 3.60 ± 0.42c | 1.85 ± 0.09d |
| Octanoic acid, ethyl ester | ND | ND | ND | 5.89 ± 1.44a | 0.13 ± 0.01b | 4.40 ± 1.52a | 0.67 ± 0.21c |
| Acetic acid | ND | 0.60 ± 0.03a | 3.19 ± 0.22c | 0.61 ± 0.07a | 1.56 ± 0.35b | 0.79 ± 0.08a | 1.58 ± 0.30b |
| Benzaldehyde | ND | 1.93 ± 0.33d | 0.42 ± 0.03c | 0.37 ± 0.10a | 0.23 ± 0.00b | 0.55 ± 0.05c | 0.22 ± 0.00b |
| Linalool | 7.83 ± 0.43a | 9.35 ± 0.10b | 10.31 ± 0.31d | 14.82 ± 1.58b | 4.42 ± 0.47c | 10.93 ± 1.63b | 3.77 ± 0.55c |
| Decanoic acid, ethyl ester | ND | ND | ND | 2.69 ± 1.02a | 0.11 ± 0.00b | 3.40 ± 0.55a | 0.79 ± 0.27d |
| alpha-Terpineol | 1.10 ± 0.00a | 1.29 ± 0.00a | 2.12 ± 0.09c | 3.02 ± 0.34b | 1.36 ± 0.07a | 2.55 ± 0.53c | 1.03 ± 0.19a |
| Methyl salicylate | ND | 0.55 ± 0.22a | 1.83 ± 0.04e | 0.29 ± 0.05a | 4.03 ± 0.12b | 13.65 ± 2.42c | 5.36 ± 0.18d |
| beta-Damascenone | 0.33 ± 0.01a | 0.35 ± 0.01a | 0.27 ± 0.01 a | 0.82 ± 0.08b | 0.09 ± 0.01c | 1.22 ± 0.44b | 0.11 ± 0.01c |
| Dodecanoic acid, ethyl ester | ND | ND | ND | 1.59 ± 0.08a | 0.33 ± 0.11b | 1.88 ±0.17a | 1.01 ± 0.17c |
| Geraniol | ND | 3.55 ± 1.46a | 3.28 ± 0.15a | 3.40 ± 0.51a | 1.92 ± 0.11b | 7.25 ± 0.53c | 1.73 ± 0.07b |
| Benzyl alcohol | ND | 8.54 ± 0.48c | 5.07 ± 0.12d | 2.97 ± 0.55a | 4.29 ± 0.15b | 7.80 ± 0.41c | 4.15 ± 0.03b |
| 2-Phenylethyl alcohol | ND | 2.83 ± 0.32c | 1.94 ± 0.04d | 11.81 ± 2.73a | 11.15 ± 0.41a | 14.91 ± 0.62a | 8.73 ± 0.22b |
| Dihydroactinidiolide | 0.13 ± 0.02a | 0.30 ± 0.03d | 0.17 ± 0.01b | 0.17 ± 0.01b | 0.08 ± 0.00c | 0.19 ± 0.00b | 0.08 ± 0.00c |

*Sterilized green tea infusion without inoculation;
^Green tea infusion fermented with a monoculture of *Lactobacillus plantarum* 299V;
#Green teai nfusion fermented with a monoculture of *S. boulardii*;
&Green tea infusion fermented with *Lactobacillus plantarum* 299V and *Saccharomyces boulardii* CNCM I-745.
The fermentation was done in triplicate (n = 3).
ND = Not detected.
Values with a different letter are significantly different (P < 0.05).

Co-inoculation of *Saccharomyces boulardii* CNCM I-745 and *Lactobacillus plantarum* 299V largely boosted aroma production during the fermentation of green tea infusion, which in turn largely enhanced the fruity and floral flavour in the probiotic tea. Application of lactic acid bacteria fermentation with yeast fermentation created a naturally acidified condition that favoured the metabolism of *S. boulardii* CNCM I-745 and elevated ethyl ester production. Additionally, *S. boulardii* CNCM I-745 fermentation consumed part of the lactic acid produced by *L. plantarum* 299V to create a favourable environment for *L. plantarum* 299V and improving the survival of the LAB in probiotic green tea. Mixed yeast and lactic acid bacteria fermentation is therefore a new strategy for green tea flavour modulation and preservation of *L. plantarum* viability.

Example 2—*Saccharomyces cerevisiae* CNCM I-3856 and *Lactobacillus plantarum* 299V Fermented Black Tea Infusion Materials and Method Black tea infusion (5% w/w) with 0.5% glucose was sterilized at 121° C. for 15 minutes, then cooled to room temperature. Fermentation of black tea infusion was conducted by inoculating black tea infusion with a monoculture of *Saccharomyces cerevisiae* CNCM I-3856 or *Lactobacillus plantarum* 299V, or a co-culture of these two microorganisms, to obtain an initial cell population of approximately 5-7 log CFU/mL for both the yeast and LAB in the media. Fermentation was conducted at 3° C. for 2 days, then transferred to room temperature (25° C.) for 85 days.

Sterilized black tea infusion with no microbial fermentation/inoculation was incubated under the same conditions and used as the control. For both fermented and unfermented black teas, instrumental analyses on volatiles and non-volatiles were conducted.

Results

FIG. 5 shows the viable cell count kinetics of *S. cerevisiae* and *L. plantarum* in both mono- and co-cultured black tea infusion media during fermentation and storage. The extent of *L. plantarum* growth differed in mono- and co-cultures during fermentation.

For *L. plantarum* monoculture, an increase in cell count of 2 Log CFU/mL was achieved within 2 days, which then decreased gradually till day 17 followed by a sharp decrease to undetectable levels on day 31. For *L. plantarum* in co-culture medium, an increase in cell population of about 2.0 log CFU/mL was achieved after 10 days, and remained stable for the next 77 days.

Compared to the *L. plantarum* monoculture in black tea infusion, co-culturing the LAB with *S. cerevisiae* extended its survival significantly. The *S. cerevisiae* in both mono- and co-cultured tea showed similar growth and survival patterns. Yeast cell count increased by about 2 log CFU/mL within one day and remained relatively stable for the next 86 days (FIG. 5).

Two monosaccharides, glucose and fructose, were detected in unfermented black tea. All fructose was consumed by *S. cerevisiae* and *L. plantarum* within two days. *S. cerevisiae* was able to metabolize glucose more rapidly than *L. plantarum*, as shown by the complete depletion of this sugar in single yeast and mixed culture fermented black tea infusion within two days, but 2.99 g/L of glucose remained in *L. plantarum* fermented black tea infusion after 31 days (Table 3). The metabolism of sugars by *L. plantarum* led to the increase of lactic acid in single *L. plantarum* and co-culture fermentations (Table 3).

TABLE 3

Changes in sugars and organic acids in black tea infusion during fermentation with *Lactobacillus plantarum* 299V and *Saccharomyces cerevisiae* CNCM I-3856, and their combination

| | | *L. plantarum*^ | | *S. cerevisiae*# | | Co-Culture& | |
|---|---|---|---|---|---|---|---|
| Sugars (g/L) | Unfermented* | Day 2 | Day 31 | Day 2 | Day 31 | Day 2 | Day 31 |
| Glucose | 6.80 ± 0.12a | 3.49 ± 0.06b | 2.99 ± 0.02c | ND | ND | ND | ND |
| Fructose | 0.61 ± 0.01 | ND | ND | ND | ND | ND | ND |
| Organic acids (g/L) | | | | | | | |
| Lactic acid | 1.90 ± 0.03a | 3.30 ± 0.02b | 2.64 ± 0.07c | 1.76 ± 0.01e | 1.89 ± 0.06a | 2.07 ± 0.04d | 2.04 ± 0.05d |
| Malic acid | 0.39 ± 0.02a | 0.35 ± 0.01a | 0.29 ± 0.06a | 0.42 ± 0.05a | 0.38 ± 0.06a | 0.37 ± 0.01a | 0.37 ± 0.03a |
| Succinic acid | 0.73 ± 0.08a | 0.60 ± 0.11a | 0.49 ± 0.03b | 0.80 ± 0.07a | 0.79 ± 0.04a | 0.78 ± 0.05a | 0.74 ± 0.16a |

*Sterilized black tea infusion without inoculation;

^Black tea infusion fermented with a monoculture of *Lactobacillus plantarum* 299V;

#Black tea infusion fermented with a monoculture of *Saccharomyces cerevisiae* CNCM I-3856;

&Black tea infusion fermented with *Lactobacillus plantarum* 299V and *Saccharomyces cerevisiae* CNCM I-3856.

Fermentations were done in triplicate (n = 3).

ND = Not detected.

Values with a different letter are significantly different ($P < 0.05$).

Amino acid metabolism in black tea showed varying patterns during fermentation. The increase in certain amino acids is likely related to the hydrolysis of protein or de novo biosynthesis by *S. cerevisiae* and *L. plantarum*, while the decline of others were associated with the generation of flavour compounds (FIG. 6). For example, phenylalanine can be converted into 2-phenylethyl alcohol by *S. cerevisiae* during fermentation (Table 4).

The volatiles associated with the metabolic activities of *S. cerevisiae* CNCM I-3856, *L. plantarum* 299V and their combination during fermentation of black tea infusion are shown in Table 4. Ethyl esters with fruity notes were generated from the metabolism of *S. cerevisiae* in both the single yeast and co-culture fermentations. Compared to single *L. plantarum* 299V fermentation, the co-inoculation of *L. plantarum* 299V with *S. cerevisiae* CNCM I-3856 in black tea infusion generated greater amounts of esters and alcohols, such as ethyl octanoate, ethyl decanoate, ethyl dodecanoate, and 2-phenylethyl alcohol.

TABLE 4

Changes in key volatiles (peak area × $10^5$) in black tea infusion during fermentation with *Saccharomyces cerevisiae* CNCM I-3856 and *Lactobacillus plantarum* 299V, and their combination

| Compound | Unfermented* | *L. plantarum*^ Day 2 | *L. plantarum*^ Day 31 | *S. cerevisiae*# Day 2 | *S. cerevisiae*# Day 31 | Co-Culture& Day 2 | Co-Culture& Day 31 |
|---|---|---|---|---|---|---|---|
| beta-Myrcene | 0.25 ± 0.01a | 0.11 ± 0.00b | 0.12 ± 0.00b | 0.13 ± 0.01b | 0.08 ± 0.01c | 0.09 ± 0.01b | 0.10 ± 0.00b |
| Hexanoic acid, ethyl ester | ND | ND | ND | 0.17 ± 0.00a | 0.08 ± 0.01b | 0.11 ± 0.00b | 0.10 ± 0.00b |
| Acetoin | ND | 0.10 ± 0.04a | 0.09 ± 0.00a | ND | ND | ND | ND |
| 2-Heptanol | ND | 1.11 ± 0.04c | 0.99 ± 0.02a | 0.89 ± 0.01a | 0.43 ± 0.16b | 0.52 ± 0.05b | 0.46 ± 0.02b |
| 1-Hexanol | ND | ND | ND | 0.64 ± 0.03a | 0.37 ± 0.03b | 0.45 ± 0.02c | 0.40 ± 0.07b,c |
| 3-Hexen-1-ol | 0.16 ± 0.01a | ND | ND | 0.56 ± 0.01b | 0.31 ± 0.07c | ND | 0.31 ± 0.06c |
| Octanoic acid, ethyl ester | ND | ND | ND | 0.11 ± 0.02a | ND | 0.17 ± 0.01b | 0.15 ± 0.02b |
| Acetic acid | 0.27 ± 0.02a | 1.22 ± 0.08b | 0.83 ± 0.05d | 1.31 ± 0.01b | 1.03 ± 0.12b | 1.38 ± 0.09b | 1.68 ± 0.01c |
| Benzaldehyde | 1.05 ± 0.07a | 0.47 ± 0.01c | 0.43 ± 0.03c | 0.13 ± 0.01b | ND | 0.14 ± 0.06b | 0.09 ± 0.01b |
| Linalool | 2.72 ± 0.19a | 1.27 ± 0.02c | 0.94 ± 0.00c.d | 1.58 ± 0.20b | 0.97 ± 0.05c | 1.09 ± 0.00d | 0.91 ± 0.01c |
| Decanoic acid, ethyl ester | ND | ND | ND | 0.15 ± 0.03a | ND | 0.18 ± 0.02a | 0.15 ± 0.01a |
| Benzeneacetaldehyde | 5.89 ± 0.03a | 0.96 ± 0.04c | 0.82 ± 0.01d | ND | ND | 0.38 ± 0.07b | ND |
| Methyl salicylate | 1.66 ± 0.10a | 1.38 ± 0.05a | 1.33 ± 0.07a | 5.24 ± 0.87b | 3.89 ± 0.01c | 3.77 ± 0.13c | 3.46 ± 0.00c |
| Dodecanoic acid, ethyl ester | ND | ND | ND | 0.54 ± 0.08a | 0.13 ± 0.01b | 0.34 ± 0.01c | 0.20 ± 0.01d |
| Benzyl alcohol | 0.52 ± 0.01a | 0.93 ± 0.01b | 0.73 ± 0.00c | 1.01 ± 0.14b | 0.72 ± 0.04c | 0.75 ± 0.01c | 0.73 ± 0.03c |
| 2-Phenylethyl alcohol | 1.09 ± 0.04a | 1.60 ± 0.08d | 1.32 ± 0.04f | 14.11 ± 1.89b | 9.67 ± 0.21c | 8.46 ± 0.03d | 7.97 ± 0.09d |
| 2,4-Di-tert-butylphenol | 7.34 ± 0.18a | 4.90 ± 0.06d | 5.06 ± 0.04d | 25.19 ± 6.33b | 17.82 ± 0.17c | 17.35 ± 0.47c | 17.89 ± 0.06c |
| Benzeneacetic acid | 0.08 ± 0.00a | 0.13 ± 0.01b | 0.08 ± 0.00a | ND | 0.08 ± 0.01a | 0.08 ± 0.00a | 0.06 ± 0.01a |

*Unfermented, sterilized black tea infusion without inoculation;

^Black tea infusion fermented with a monoculture of *L. plantarum* 299V;

#Black teainfusion fermented with a monoculture of *S. cerevisiae* CNCM I-3856;

&Black tea infusion fermented with *L. plantarum* 299V and *S. cerevisiae* CNCM I-3856.

The fermentation was done in triplicate (n = 3).

ND = Not detected.

Values with a different letter are significantly different ($P < 0.05$).

Example 3—*Saccharomyces boulardii* CNCM I-745 and *Lactobacillus plantarum* 299V Fermented Black Tea Infusion Materials and Method Black tea infusion (5% w/w) with 0.5% glucose was sterilized at 121° C. for 15 minutes, then cooled to room temperature. Fermentation of black tea infusion was conducted by inoculating black tea infusion with monoculture of *Saccharomyces boulardii* CNCM I-745 or *Lactobacillus plantarum* 299V, or a co-culture of these microorganisms to obtain an initial cell population of approximately 5-7 log CFU/mL for both the yeast and LAB in the media. Fermentation was conducted at 30° C. for 2 days, then transferred to room temperature (25° C.) for 85 days.

Sterilized black tea infusion with no microbial fermentation/inoculation was incubated under the same conditions and used as the control. For both fermented and unfermented black teas, instrumental analyses on volatiles and non-volatiles were conducted.

Results

FIG. 7 shows the viable cell count kinetics of *S. boulardii* and *L. plantarum* in both mono- and co-cultured black tea infusion media during fermentation and storage. The extent of *L. plantarum* growth differed in mono- and co-cultures during fermentation.

For *L. plantarum* monoculture, an increase in cell count of 2 log CFU/mL was achieved within 2 days, which then decreased gradually till day 24 followed by a sharp decrease to undetectable levels on day 31. For *L. plantarum* in co-culture medium, an increase in cell population of about 2 log CFU/mL were achieved after 10 days, and remained stable for the next 77 days.

Compared to the *L. plantarum* monoculture in black tea infusion, co-culturing the LAB with *S. boulardii* extended its survival significantly. The *S. boulardii* in both mono- and co-cultured tea showed similar growth and survival patterns. Yeast cell count increased by about 2.5 log CFU/mL, which was reached within one day and remained stable for the next 86 days.

Two monosaccharides, glucose and fructose, were detected in unfermented black tea. All fructose was consumed by *S. boulardii* and *L. plantarum* within two days. *S. boulardii* was able to metabolize glucose more rapidly than *L. plantarum*, as shown by the complete depletion of this sugar in single yeast and mixed fermented black tea infusion within two days, but 2.99 g/L of glucose remained in *L. plantarum* fermented black tea infusion (Table 5). The metabolism of sugars by *L. plantarum* led to the increase of lactic acid in single *L. plantarum* and co-culture fermentations (Table 5).

TABLE 5

Changes in sugars and organic acids in black tea infusion during fermentation with *Lactobacillus plantarum* 299V and *Saccharomyces boulardii* CNCM I-745, and their combination

| Sugars (g/L) | Unfermented* | *L. plantarum*^ Day 2 | *L. plantarum*^ Week 4 | *S. boulardii*# Day 2 | *S. boulardii*# Week 4 | Co-Culture& Day 2 | Co-Culture& Week 4 |
|---|---|---|---|---|---|---|---|
| Glucose | 6.80 ± 0.12a | 3.49 ± 0.06b | 2.99 ± 0.02c | ND | ND | ND | ND |
| Fructose | 0.61 ± 0.01 | ND | ND | ND | ND | ND | ND |
| Organic acids (g/L) | | | | | | | |

TABLE 5-continued

Changes in sugars and organic acids in black tea infusion during fermentation with *Lactobacillus plantarum* 299V and *Saccharomyces boulardii* CNCM I-745, and their combination

| Sugars (g/L) | Unfermented* | *L. plantarum*^ | | *S. boulardii*# | | Co-Culture& | |
|---|---|---|---|---|---|---|---|
| | | Day 2 | Week 4 | Day 2 | Week 4 | Day 2 | Week 4 |
| Lactic acid | 1.90 ± 0.03a | 3.30 ± 0.02b | 2.64 ± 0.07c | 2.11 ± 0.02d | 2.15 ± 0.02d | 2.05 ± 0.02d | 2.10 ± 0.01d |
| Malic acid | 0.39 ± 0.02a | 0.35 ± 0.01a | 0.29 ± 0.06a | 0.41 ± 0.02a | 0.37 ± 0.02a | 0.37 ± 0.01a | 0.37 ± 0.01a |
| Succinic acid | 0.73 ± 0.08a | 0.60 ± 0.11a | 0.49 ± 0.03b | 0.75 ± 0.01a | 0.81 ± 0.07a | 0.75 ± 0.03a | 0.78 ± 0.02a |

*Sterilized black tea infusion without inoculation;
^Black tea infusion fermented with a monoculture of *Lactobacillus plantarum* 299V;
#Black tea infusion fermented with a monoculture of *Saccharomyces boulardii* CNCM I-745;
&Black tea infusion fermented with *Lactobacillus plantarum* 299V and *Saccharomyces boulardii* CNCM I-745.
Fermentations were done in triplicate (n = 3).
ND = Not detected.
Values with a different letter are significantly different ($P < 0.05$).

Amino acids metabolism in black tea infusion showed varying patterns during fermentation. The increase in certain amino acids are probably related to the hydrolysis of protein or de novo biosynthesis by *S. boulardii* and *L. plantarum*, while the decline in others are likely associated with the generation of volatile flavour compounds (FIG. 8). For example, phenylalanine can be converted into 2-phenylethyl alcohol by *S. boulardii* fermentation (Table 6).

The volatiles associated with the metabolic activities of *S. boulardii, L. plantarum*, and their combination during fermentation of black tea infusion are shown in Table 6. Aroma compounds changes of fermented probiotic teas are similar to those of Example 2. More ethyl esters with fruity notes and phenylethyl alcohol were generated in both the single yeast and co-culture fermentations than in *L. plantarum* monoculture fermentation.

TABLE 6

Changes in key volatiles (peak area × $10^5$) in black tea infusion during fermentation with *Lactobacillus plantarum* 299V and *Saccharomyces boulardii* CNCM-I745, and their combination

| Compound | Unfermented* | *L. plantarum*^ | | *S. boulardii*# | | Co-Culture& | |
|---|---|---|---|---|---|---|---|
| | | Day 2 | Week 4 | Day 2 | Week 4 | Day 2 | Week 4 |
| beta-Myrcene | 0.25 ± 0.01a | 0.11 ± 0.00c | 0.12 ± 0.00c | 0.17 ± 0.02b | 0.11 ± 0.00c | 0.08 ± 0.00d | 0.11 ± 0.00c |
| Hexanoic acid, ethyl ester | ND | ND | ND | 0.36 ± 0.04a | 0.19 ± 0.02b | 0.19 ± 0.01b | 0.16 ± 0.01b |
| Acetoin | ND | 0.10 ± 0.04a | 0.09 ± 0.00a | ND | ND | ND | ND |
| 2-Heptanol | ND | 1.11 ± 0.04a | 0.99 ± 0.02a | 1.03 ± 0.09a | 0.55 ± 0.04b | 0.57 ± 0.10b | 0.50 ± 0.00b |
| 1-Hexanol | ND | ND | ND | 0.84 ± 0.03a | 0.43 ± 0.02b | ND | ND |
| 3-Hexen-1-ol | 0.16 ± 0.01a | ND | ND | 0.66 ± 0.07b | 0.37 ± 0.02c | 0.39 ± 0.01c | 0.31 ± 0.02c |
| Octanoic acid, ethyl ester | ND | ND | ND | 0.77 ± 0.04a | 0.21 ± 0.01b | 0.40 ± 0.00c | 0.23 ± 0.00b |
| Acetic acid | 0.27 ± 0.02a | 1.22 ± 0.08e | 0.83 ± 0.05f | 2.99 ± 0.04b | 2.17 ± 0.02c | 1.86 ± 0.10d | 1.64 ± 0.25d |
| Benzaldehyde | 1.05 ± 0.07a | 0.47 ± 0.01d | 0.43 ± 0.03d | 0.23 ± 0.00b | 0.11 ± 0.01c | ND | ND |
| Linalool | 2.72 ± 0.19a | 1.27 ± 0.02d | 0.94 ± 0.00c | 1.83 ± 0.12b | 1.11 ± 0.22c | 1.06 ± 0.06c | 0.99 ± 0.00c |
| Decanoic acid, ethyl ester | ND | ND | ND | 0.56 ± 0.03a | 0.14 ± 0.01b | 0.27 ± 0.00c | 0.13 ± 0.00b |
| Benzeneacetaldehyde | 5.89 ± 0.03a | 0.96 ± 0.04b | 0.82 ± 0.01d | 0.91 ± 0.08b | 0.43 ± 0.01c | 0.51 ± 0.05c | 0.41 ± 0.00c |
| Methyl salicylate | 1.66 ± 0.10a | 1.38 ± 0.05d | 1.33 ± 0.07d | 5.47 ± 0.13b | 3.41 ± 0.03c | 3.46 ± 0.13c | 3.35 ± 0.02c |
| Dodecanoic acid, ethyl ester | ND | ND | ND | 0.42 ± 0.01a | 0.17 ± 0.00b | ND | ND |
| Benzyl alcohol | 0.52 ± 0.01a | 0.93 ± 0.01d | 0.73 ± 0.00c | 1.23 ± 0.02b | 0.76 ± 0.01c | 0.74 ± 0.00c | 0.74 ± 0.02c |
| 2-Phenylethyl alcohol | 1.09 ± 0.04a | 1.60 ± 0.08d | 1.32 ± 0.04e | 12.22 ± 0.01b | 7.94 ± 0.10c | 7.38 ± 0.08c | 7.36 ± 0.05c |
| 2,4-Di-tert-butylphenol | 7.34 ± 0.18a | 4.90 ± 0.06e | 5.06 ± 0.04e | 27.43 ± 0.45b | 15.36 ± 0.40c | 17.67 ± 0.18d | 16.75 ± 0.03d |
| Benzeneacetic acid | 0.08 ± 0.00a | 0.13 ± 0.01b | 0.08 ± 0.00a | 0.12 ± 0.00b | 0.07 ± 0.00a | 0.07 ± 0.00a | ND |

*Unfermented, sterilized black tea infusion without inoculation;
^Black tea infusion fermented with a monoculture of *L. plantarum* 299V;
#Black tea infusion fermented with a monoculture of *S. boulardii* CNCM-I745;
&Black tea infusion fermented with *L. plantarum* 299V and *S. boulardii* CNCM-I745.
The fermentation was done in triplicate (n = 3).
ND = Not detected.
Values with a different letter are significantly different ($P < 0.05$).

The co-fermentation of black tea infusion with the probiotic cultures *Lactobacillus plantarum* 299V with either *Saccharomyces cerevisiae* CNCM I-3856 or *Saccharomyces boulardii* CNCM I-745 maintained a viable probiotic population (≥$10^6$ CFU/mL) during fermentation and storage under room temperature for 87 days. Co-culturing yeast and LAB largely boosted the aroma compounds production during the fermentation of black tea infusion which in turn largely enhanced the fruity and floral flavour in the probiotic tea. Application of lactic acid bacteria fermentation with yeast fermentation created a naturally acidified condition that favoured the metabolism of yeasts and elevated ethyl ester production.

Whilst the foregoing description has described exemplary embodiments, it will be understood by those skilled in the technology concerned that many variations may be made without departing from the present invention.

The invention claimed is:

1. A tea-based beverage comprising probiotics, wherein the probiotics have a live probiotic cell count of ≥6.0 log CFU/mL, wherein the probiotics comprise a probiotic lactic acid bacteria and a probiotic *Saccharomyces* yeast, wherein the probiotic lactic acid bacteria is selected from the group comprising: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei*, or a combination thereof, and wherein the probiotics comprised in the beverage have a live probiotic cell count of ≥6.0 log CFU/mL after 3 months of storage.

2. The beverage according to claim 1, wherein the probiotics have a live probiotic cell count of ≥7.0 log CFU/mL.

3. The beverage according to claim 1, wherein the beverage is a fermented beverage.

4. The beverage according to claim 1, wherein the beverage further comprises an additive.

5. The beverage according to claim 4, wherein the additive is selected from: a sweetener, a stabilizer, a flavouring, or a combination thereof.

6. A method of preparing a tea-based beverage comprising probiotics having a live cell count of ≥6.0 log CFU/mL, the method comprising:

mixing tea infusion with a sugar to form a mixture having a total volume;

adding probiotics to the mixture to form an inoculated mixture; and fermenting the inoculated mixture for a pre-determined period of time to form the beverage, wherein the probiotics comprise a probiotic lactic acid bacteria and a probiotic *Saccharomyces* yeast, wherein the probiotic lactic acid bacteria is selected from the group comprising: *Lactobacillus* (Lb.) *plantarum, Lactobacillus* (Lb.) *acidophilus, Lactobacillus* (Lb.) *gasseri, Lactobacillus* (Lb.) *fermentum, Lactobacillus* (Lb.) *rhamnosus, Lactobacillus* (Lb.) *paracasei*, or a combination thereof, and wherein the probiotics comprised in the beverage have a live probiotic cell count of ≥6.0 log CFU/mL after 3 months of storage.

7. The method according to claim 6, wherein the beverage has a live cell count of ≥7.0 log CFU/mL.

8. The method according to claim 6, wherein the sugar is present in the mixture at a concentration of 0.01-10% w/v based on the total volume of the mixture.

9. The method according to claim 6, wherein the mixture further comprises a yeast extract.

10. The method according to claim 9, wherein the yeast extract comprised in the mixture is present at a concentration of 0.01-5.0% w/v based on the total volume of the mixture.

11. The method according to claim 6, wherein the adding comprises adding probiotics to obtain an initial probiotic live count of 5-7 log CFU/mL.

12. The method according to claim 6, wherein the pre-determined period of time is 4-100 hours.

13. The method according to claim 6, wherein the fermenting is at a temperature of 15-45° C.

14. The method according to claim 6, further comprising heating the mixture prior to the adding probiotics.

* * * * *